United States Patent
Hotta et al.

(10) Patent No.: US 11,296,582 B2
(45) Date of Patent: Apr. 5, 2022

(54) STATOR AND METHOD FOR MANUFACTURING STATOR

(71) Applicant: DENSO CORPORATION, Kariya (JP)

(72) Inventors: Koji Hotta, Kariya (JP); Motoki Uehama, Kariya (JP); Takumi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 365 days.

(21) Appl. No.: 16/426,718

(22) Filed: May 30, 2019

(65) Prior Publication Data
US 2020/0014288 A1 Jan. 9, 2020

(30) Foreign Application Priority Data

Jul. 5, 2018 (JP) .............................. JP2018-128413
Jul. 5, 2018 (JP) .............................. JP2018-128414
Jul. 5, 2018 (JP) .............................. JP2018-128415

(51) Int. Cl.
*H02K 5/22* (2006.01)
*H02K 15/00* (2006.01)
*H02K 3/52* (2006.01)

(52) U.S. Cl.
CPC ......... *H02K 15/0062* (2013.01); *H02K 3/522* (2013.01); *H02K 5/22* (2013.01); *H02K 15/0081* (2013.01)

(58) Field of Classification Search
CPC ...... H02K 15/0062; H02K 5/22; H02K 3/522; H02K 15/0081; H02K 2203/09
USPC ......................................................... 310/68 r
See application file for complete search history.

(56) References Cited

U.S. PATENT DOCUMENTS

| | | | |
|---|---|---|---|
| 2003/0201688 A1* | 10/2003 | Yamamura | H02K 3/50 310/71 |
| 2008/0116755 A1 | 5/2008 | Sahara et al. | |
| 2010/0072840 A1 | 3/2010 | Sahara et al. | |
| 2010/0259119 A1 | 10/2010 | Wang | |
| 2011/0234031 A1 | 9/2011 | Kato | |
| 2013/0187496 A1 | 7/2013 | Creeden et al. | |

(Continued)

FOREIGN PATENT DOCUMENTS

| | | |
|---|---|---|
| JP | 2001-218409 A | 8/2001 |
| JP | 2008-148526 A | 6/2008 |

(Continued)

OTHER PUBLICATIONS

Mar. 23, 2021 Office Action issued in U.S. Appl. No. 16/426,741.

(Continued)

*Primary Examiner* — Terrance L Kenerly
(74) *Attorney, Agent, or Firm* — Oliff PLC

(57) ABSTRACT

A stator includes a stator core, multiphase coils wound on the stator core, and a guide member. The multiphase coils include two or more terminal wires. The guide member is arranged on an end of the stator core located at one side in an axial direction to guide the terminal wires of the multiphase coils wound on the stator core. The guide member includes steps having a diameter that gradually decreases toward a side opposite to the stator core in the axial direction. Ones of the multiphase coils having the terminal wires that are drawn in a circumferential direction toward the same side are laid out on one of the steps.

23 Claims, 16 Drawing Sheets

(56) References Cited

U.S. PATENT DOCUMENTS

| | | |
|---|---|---|
| 2013/0257200 A1* | 10/2013 | Nakayama ............ H02K 5/225 |
| | | 310/71 |
| 2016/0241090 A1 | 8/2016 | Nakagawa et al. |
| 2017/0149299 A1 | 5/2017 | Sakamoto et al. |
| 2018/0351428 A1 | 12/2018 | Okamoto et al. |
| 2019/0165650 A1 | 5/2019 | Park et al. |
| 2020/0014273 A1 | 1/2020 | Ogawa et al. |

FOREIGN PATENT DOCUMENTS

| | | |
|---|---|---|
| JP | 2011-205817 A | 10/2011 |
| JP | 2014-128049 A | 7/2014 |
| JP | 2014-187797 A | 10/2014 |
| JP | 2018-050375 A | 3/2018 |
| WO | 2018/062351 A1 | 4/2018 |

OTHER PUBLICATIONS

Jan. 21, 2021 Office Action issued in Japanese Patent Application No. 2018-128413.
Jan. 21, 2021 Office Action issued in Japanese Patent Application No. 2018-128414.
Dec. 21, 2021 Office Action issued in Japanese Patent Application No. 2018-128415.
Dec. 21, 2021 Office Action issued in Japanese Patent Application No. 2018-128416.

* cited by examiner

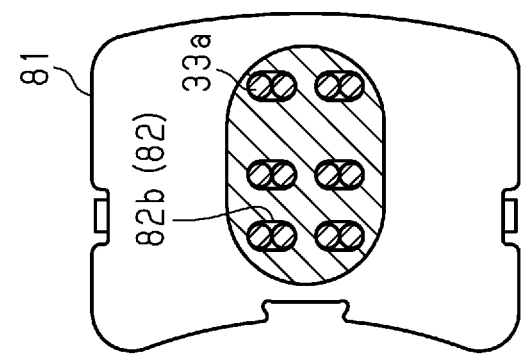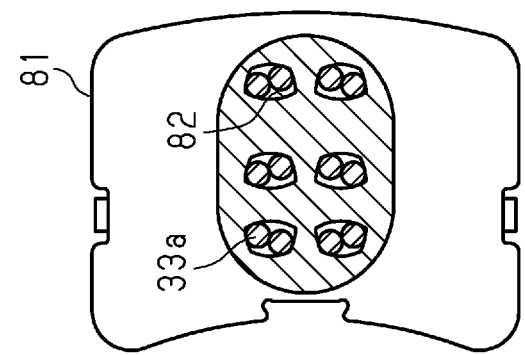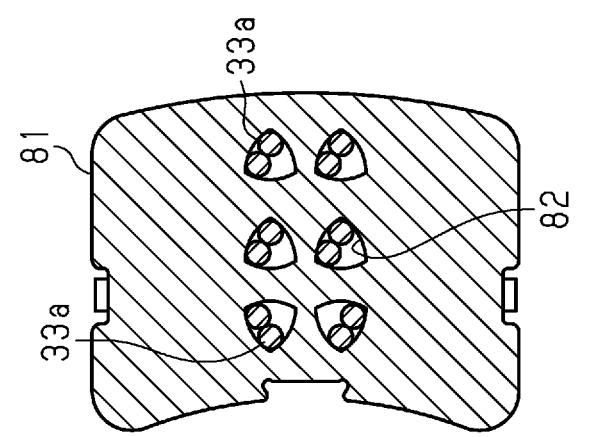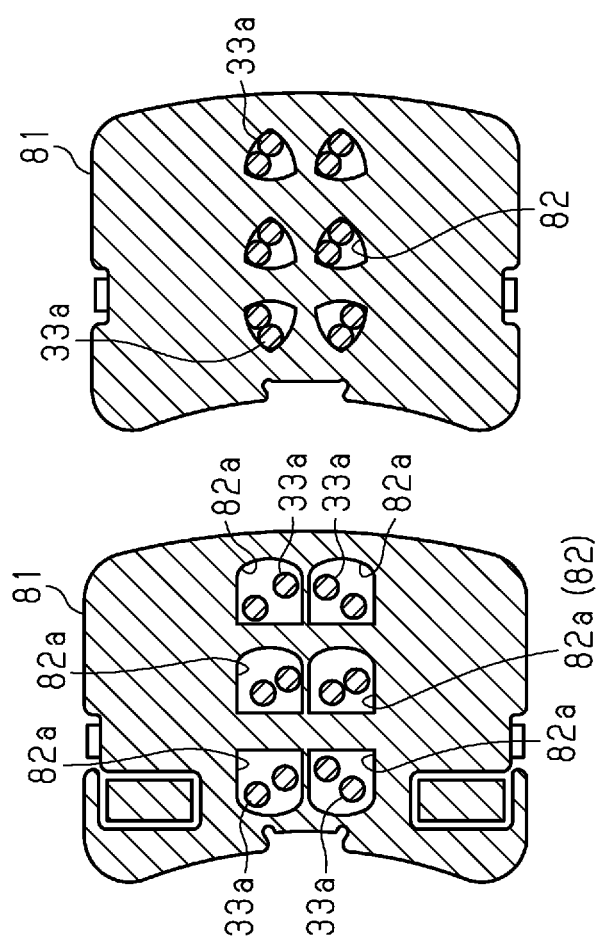

STATOR AND METHOD FOR MANUFACTURING STATOR

BACKGROUND

1. Field

The present disclosure relates to a stator and a method for manufacturing a stator.

2. Description of Related Art

In a typical motor, coils are wound on a stator core of a stator, and terminal wires of the coils are electrically connected (for example, refer to Japanese Laid-Open Patent Publication No. 2011-205817).

In the stator described in the publication described above, an insulator coupled to the stator core includes grooves extending in a radially outer side of the insulator so that the terminal wires of the coils are laid out. As the terminal wires of the coils are accommodated in the grooves, the coils of each phase are electrically connected.

In a stator such as that described above, the terminal wires are laid out at the radially outer side of the insulator. This may increase the size in the radial direction.

SUMMARY

It is an object of the present disclosure to provide a stator and a method for manufacturing a stator that limit increases in size in the radial direction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

To achieve the above object, one aspect of the present disclosure is a stator that includes a stator core, multiphase coils wound on the stator core, and a guide member. The multiphase coils include two or more terminal wires. The guide member is arranged on an end of the stator core located at one side in an axial direction to guide the terminal wires of the multiphase coils wound on the stator core. The guide member includes steps having a diameter that gradually decreases toward a side opposite to the stator core in the axial direction. Ones of the terminal wires of the multiphase coils that are drawn in a circumferential direction toward the same side are laid out on one of the steps.

Other features and aspects will be apparent from the following detailed description, the drawings, and the claims.

BRIEF DESCRIPTION OF THE DRAWINGS

FIGS. 16A to 16D are cross-sectional views showing an outlet guide of the guide member in the embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
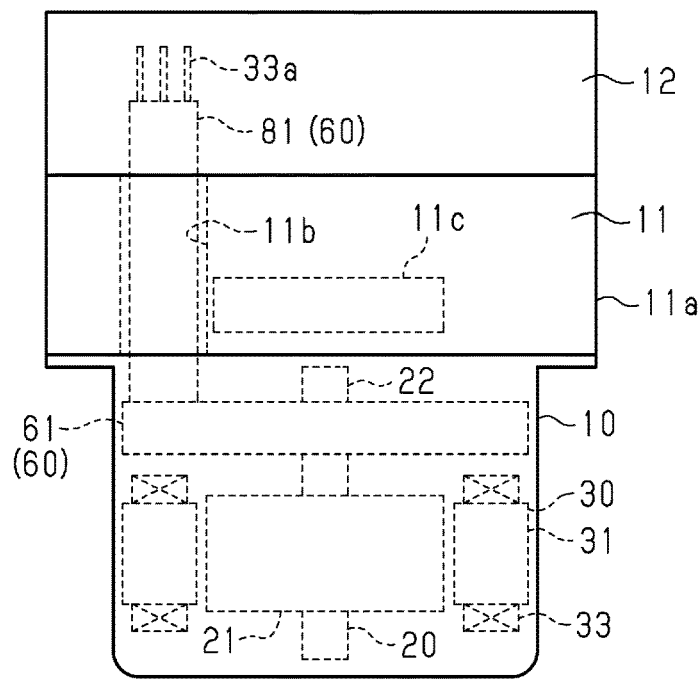
FIG. 1 is a schematic diagram showing one embodiment of a motor.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

One embodiment of a motor including a stator will now be described with reference to the drawings. To facilitate understanding, components may be enlarged or simplified in the drawings. The drawings may not have necessarily been drawn to scale.

As shown in FIG. 1, a motor 10 is used in an electric brake system. The electric brake system includes a hydraulic unit 11 that adjusts the liquid pressure of a brake fluid, the motor 10 connected to the hydraulic unit 11 to drive the hydraulic unit 11, and an electric driver unit 12 (EDU) that controls the driving of the motor 10. In the present example of the brake system, the hydraulic unit 11 is located between the EDU 12 and the motor 10. The motor 10 and the EDU 12 are electrically connected through a through hole 11b that extends in a casing 11a of the hydraulic unit 11.

The motor 10 of the present embodiment includes a rotor 20 and a stator 30.

As shown in FIG. 1, the rotor 20 includes a rotor core 21, magnets (not shown) arranged on the rotor core 21, and a rotary shaft 22 arranged in the center of the rotor core 21 in the radial direction. The rotary shaft 22 has an axial end that is directly or indirectly coupled to a gear 11c arranged in the hydraulic unit 11. When the rotary shaft 22 is driven to rotate, the gear 11c in the hydraulic unit 11 is driven to adjust the liquid pressure of the brake fluid.

Figure 2:
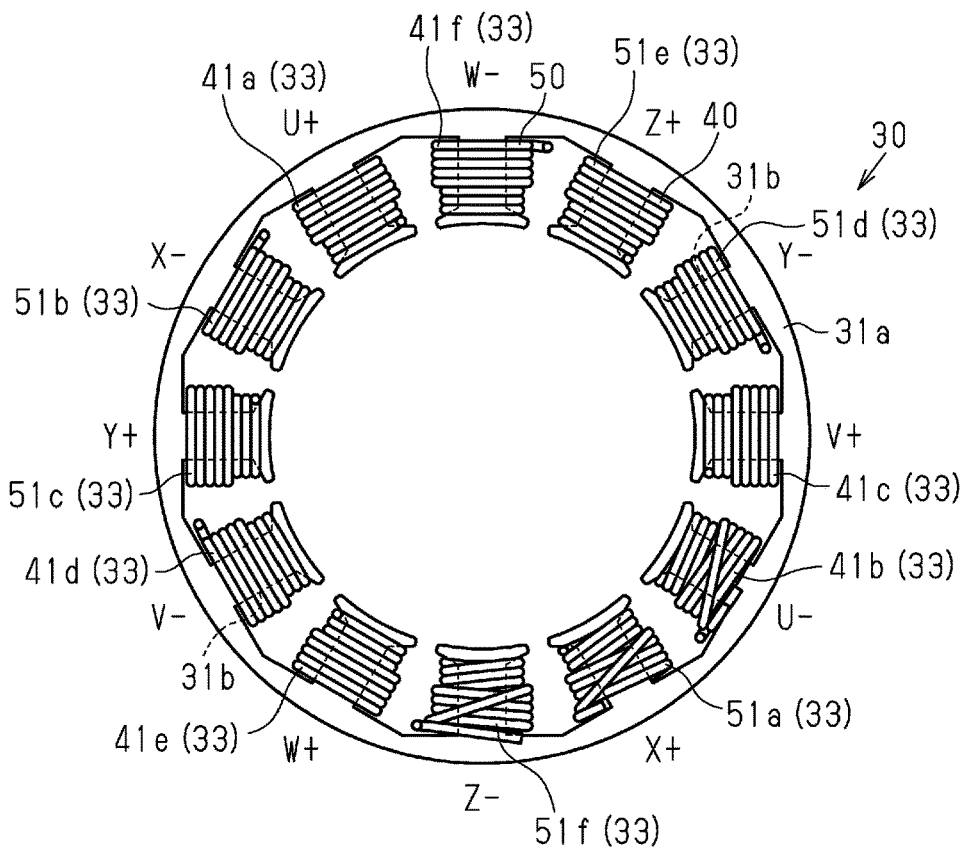
FIG. 2 is a plan view showing a stator of the embodiment from which a guide member is removed.
Figure 3:
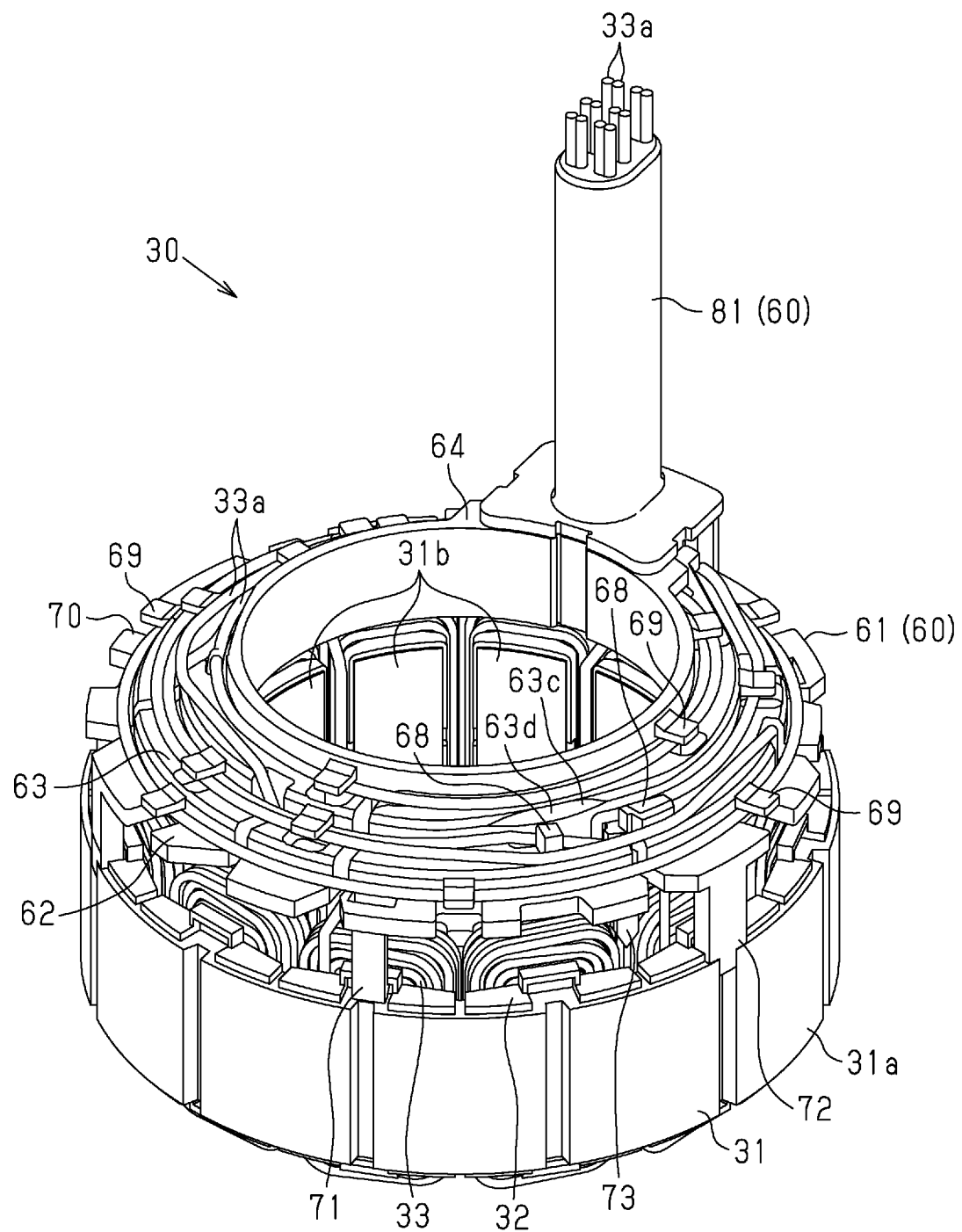
FIG. 3 is a perspective view of the stator of the embodiment.
Figure 4:
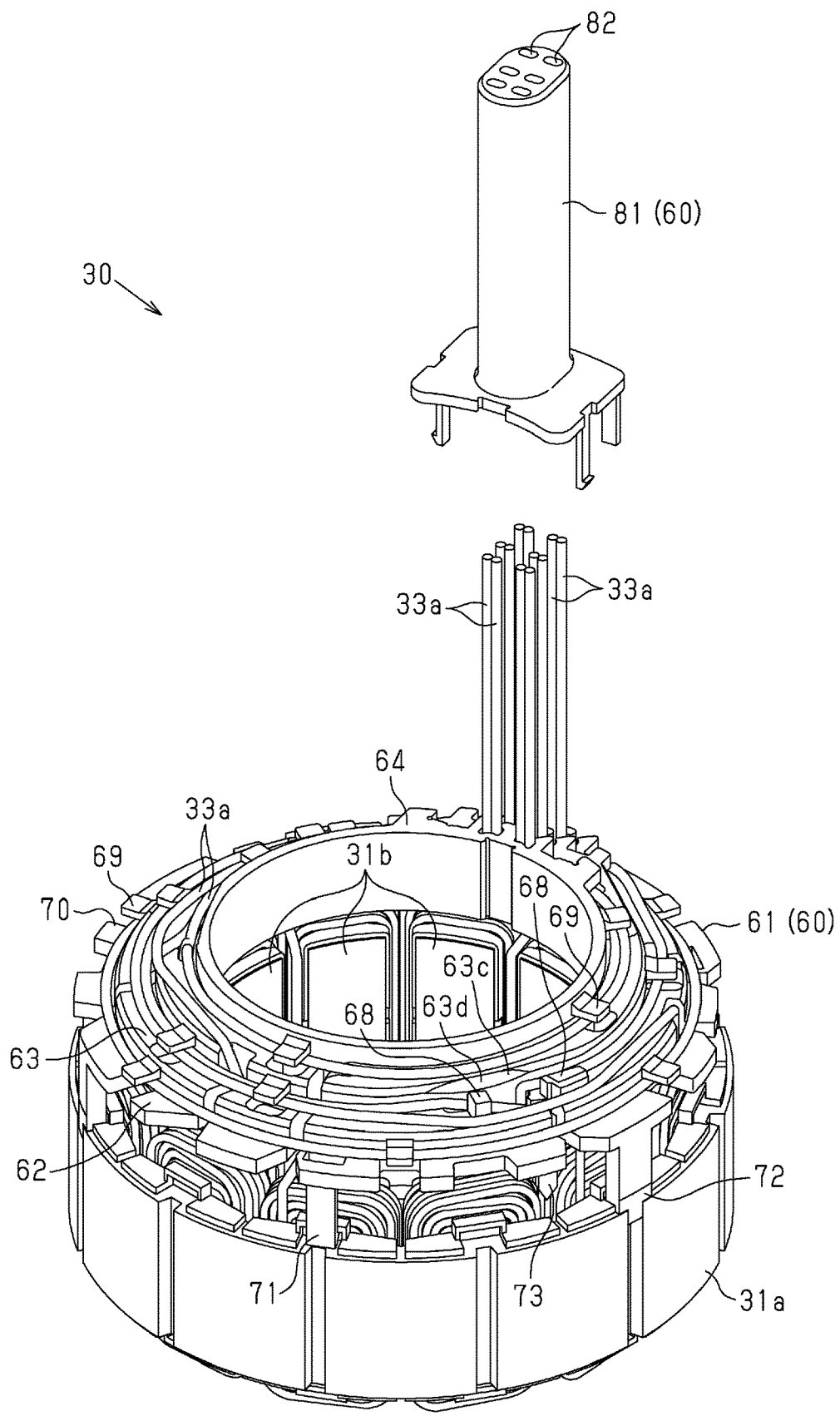
FIG. 4 is an exploded perspective view of the stator of the embodiment.

As shown in FIGS. 2 to 4, the stator 30 includes a stator core 31, an insulator 32 of the stator core 31, and stator coils 33.

The stator core 31 includes a generally circular annular portion 31a and teeth 31b extending radially inward from the annular portion 31a. In the present embodiment, for example, twelve teeth 31b are provided. The stator coils 33 are wound on each of the teeth 31b with the insulator 32 located in between. The stator coils 33 are wound in, for example, a concentrated manner.

The stator coils 33 include a first three-phase winding 40, which is electrically connected to a first inverter circuit (not shown), and a second three-phase winding 50, which is electrically connected to a second inverter circuit (not shown). That is, in the present embodiment, the two inverter circuits are used to supply current to the three-phase windings 40 and 50 and excite the three-phase windings 40 and 50.

As shown in FIG. 2, the first three-phase winding 40 includes three-phase windings 41a to 41f supplied with three-phase alternating currents, the phases of which differ from each other by 120 degrees, from the first inverter circuit. The three-phase windings 41a to 41f include a U+ phase winding 41a, a U− phase winding 41b, a V+ phase winding 41c, a V− phase winding 41d, a W+ phase winding 41e, and a W− phase winding 41f.

As shown in FIG. 2, the second three-phase winding 50 includes three-phase windings 51a to 51f supplied with three-phase alternating currents, the phases of which differ from each other by 120, from the second inverter circuit. The three-phase windings 51a to 51f include a X+ phase winding 51a, a X− phase winding 51b, a Y+ phase winding 51c, a Y− phase winding 51d, a Z+ phase winding 51e, and a Z− phase winding 51f.

The different stator coils 33 are wound on each of the teeth 31b. In the present embodiment, the stator coils 33 are wound on the stator 30, for example, in the order of the U+ phase winding 41a, the W− phase winding 41f, the Z+ phase winding 51e, the Y− phase winding 51d, the V+ phase winding 41c, the U− phase winding 41b, the X+ phase winding 51a, the Z− phase winding 51f, the W+ phase winding 41e, the V− phase winding 41d, the Y+ phase winding 51c, and the X− phase winding 51b.

The U+ phase winding 41a and the U− phase winding 41b are wound on the teeth 31b in the same direction. The V+ phase winding 41c and the V− phase winding 41d are wound on the teeth 31b in the same direction. The W+ phase winding 41e and the W− phase winding 41f are wound on the teeth 31b in the same direction. The U+ phase winding 41a and the U− phase winding 41b are wound on the teeth 31b that are located at positions separated from each other by 150 degrees in the circumferential direction. The V+ phase winding 41c and the V− phase winding 41d are wound on the teeth 31b that are located at positions separated from each other by 150 degrees in the circumferential direction. The W+ phase winding 41e and the W− phase winding 41f are wound on the teeth 31b that are located at positions separated from each other by 150 degrees in the circumferential direction.

The X+ phase winding 51a and the X− phase winding 51b are wound on the teeth 31b in the same direction. The Y+ phase winding 51c and the Y− phase winding 51d are wound on the teeth 31b in the same direction. The Z+ phase winding 51e and the Z− phase winding 51f are wound on the teeth 31b in the same direction. The X+ phase winding 51a and the X− phase winding 51b are wound on the teeth 31b that are located at positions separated from each other by 150 degrees in the circumferential direction. The Y+ phase winding 51c and the Y− phase winding 51d are wound on the teeth 31b that are located at positions separated from each other by 150 degrees in the circumferential direction. The Z+ phase winding 51e and the Z− phase winding 51f are wound on the teeth 31b that are located at positions separated from each other by 150 degrees in the circumferential direction.

The U+ phase winding 41a and the U− phase winding 41b are connected by a bridge wire (not shown). The V+ phase winding 41c and the V− phase winding 41d are connected by a bridge wire (not shown). The W+ phase winding 41e and the W− phase winding 41f are connected by a bridge wire (not shown). The X+ phase winding 51a and the X− phase winding 51b are connected by a bridge wire (not shown). The Y+ phase winding 51c and the Y− phase winding 51d are connected by a bridge wire (not shown). The Z+ phase winding 51e and the Z− phase winding 51f are connected by a bridge wire (not shown).

In the present embodiment, the first three-phase winding 40 is connected to the first inverter circuit by delta connection. The second three-phase winding 50 is connected to the second inverter circuit by delta connection. More specifically, the U+ phase winding 41a and the W− phase winding 41f, which are located adjacent to each other, have terminal wires 33a that are connected to an electrically identical terminal of the first inverter circuit. The U− phase winding 41b and the V+ phase winding 41c have terminal wires 33a that are connected to an electrically identical terminal of the first inverter circuit. The W+ phase winding 41e and the V− phase winding 41d have terminal wires 33a that are connected to an electrically identical terminal of the first inverter circuit.

The X− phase winding 51b and the Z+ phase winding 51e have terminal wires 33a that are connected to an electrically identical terminal of the second inverter circuit. The Y− phase winding 51d and the X+ phase winding 51a have terminal wires 33a that are connected to an electrically identical terminal of second inverter circuit. The Z− phase winding 51f and the Y+ phase winding 51c have terminal wires 33a that are connected to an electrically identical terminal of the second inverter circuit.

As shown in FIG. 1, a guide member 60 is arranged on a portion of the stator 30 located closer to the hydraulic unit 11, that is, toward one side in the axial direction of the stator core 31.

The guide member 60 guides the terminal wires 33a of the stator coils 33 to the EDU 12 and includes a guide body 61 and an outlet guide 81.

Figure 5:
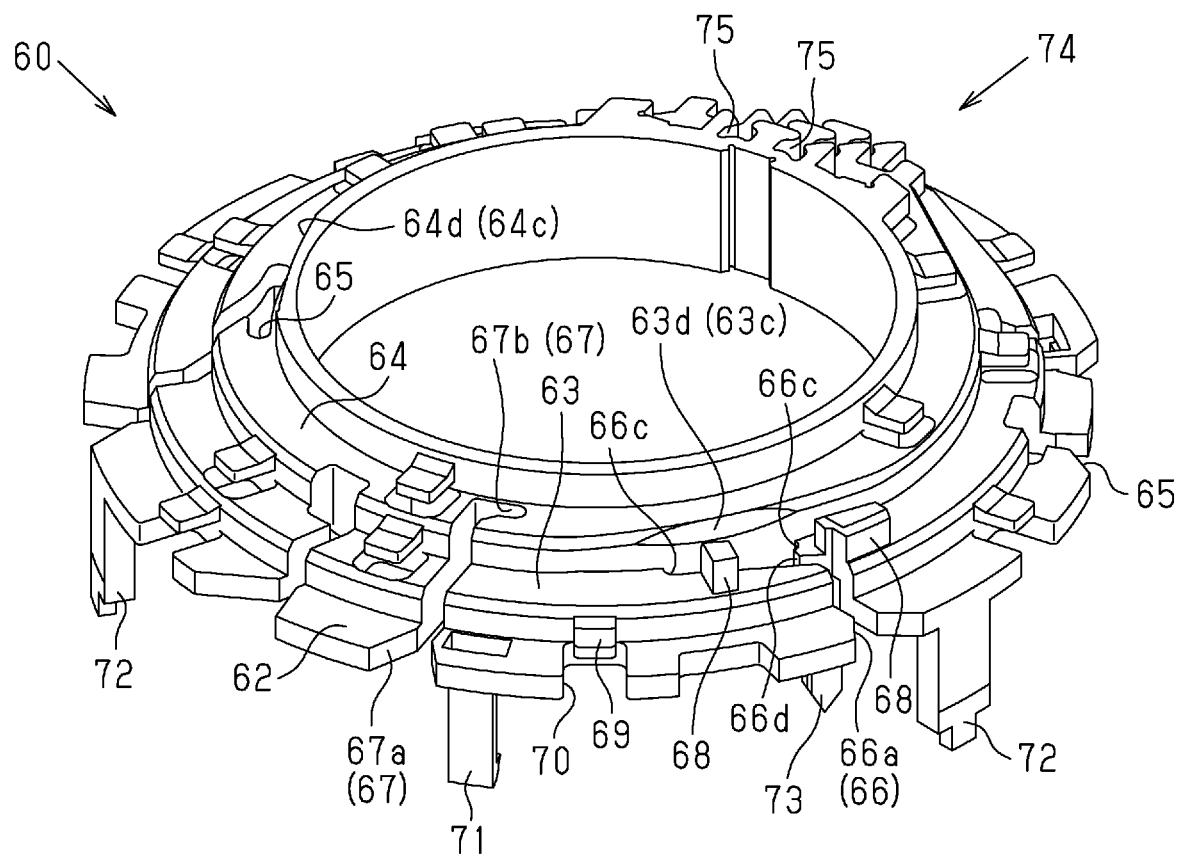
FIG. 5 is a perspective view of the guide member of the embodiment.
Figure 6:
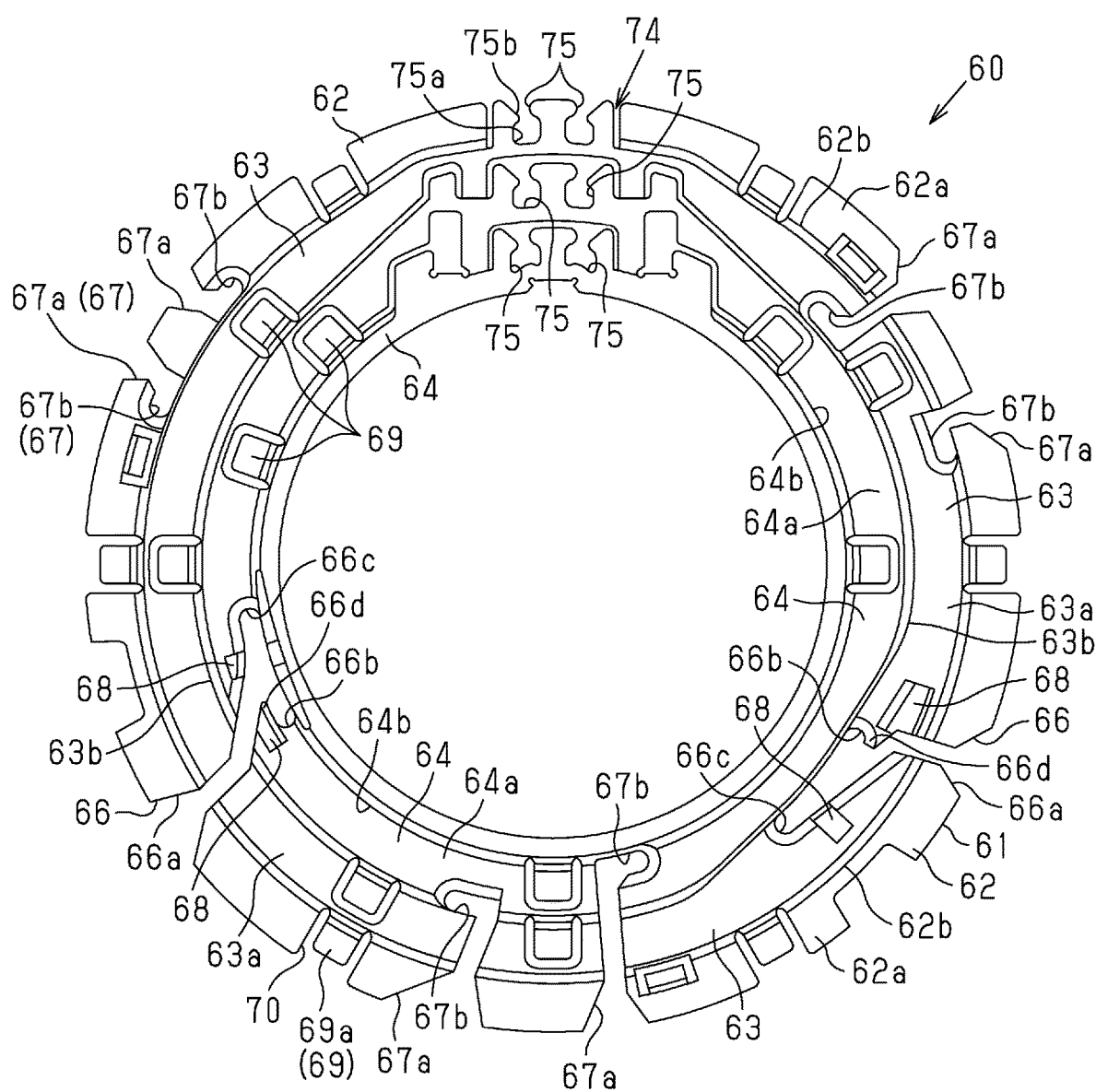
FIG. 6 is a plan view of the guide member of the embodiment.

As shown in FIGS. 5 and 6, the guide body 61 includes a lower step 62, an intermediate step 63, and an upper step 64 and has a three-step structure.

The lower step 62 includes a base 62a, which has a surface extending in the radial direction and directed in the axial direction, and a riser 62b, which has a surface extending front a radially inner side of the base 62a in the axial direction and directed in the radial direction.

The intermediate step 63 includes a base 63a, which has a surface extending in the radial direction and directed in the axial direction, and a riser 63b, which has a surface extending from a radially inner side of the base 63a in the axial direction and directed in the radial direction. The base 63a is configured to extend from an axial end of the riser 62b in the radial direction.

The upper step 64 includes a base 64a, which has a surface extending in the radial direction and directed in the axial direction, and a riser 64b, which has a surface extending front a radially inner side of the base 64a in the axial direction and directed in the radial direction. The base 64a is configured to extend from an axial end of the riser 63b in the radial direction.

When the guide body 61 is coupled to one side of the stator core 31 in the axial direction, the lower step 62 is located closer to the stator core 31 than the intermediate step 63 and the upper step 64 in the axial direction. The intermediate step 63 is located between the lower step 62 and the upper step 64. When the guide body 61 is coupled to one side of the stator core 31 in the axial direction, the upper step 64 and the stator core 31 are located at opposite sides of the lower step 62 and the intermediate step 63 in the axial direction. The lower step 62 is located at a radially outer side of the intermediate step 63 and the upper step 64. The upper step 64 is located at a radially inner side of the lower step 62 and the intermediate step 63. That is, the guide body 61 of the present embodiment is separated further from the stator core 31 in the axial direction in the order from the lower step 62, which is located at the radially outer side, and the diameter becomes smaller (that is, the diameter is decreased).

The guide body 61 includes slits 65 that guide the terminal wires 33a of the stator coils 33 from a radial outer side to a radially inner side. The slits 65 include first slits 66 and second slits 67. In the present embodiment, the guide body 61 includes two first slits 66 and six second slits 67.

Figure 7:
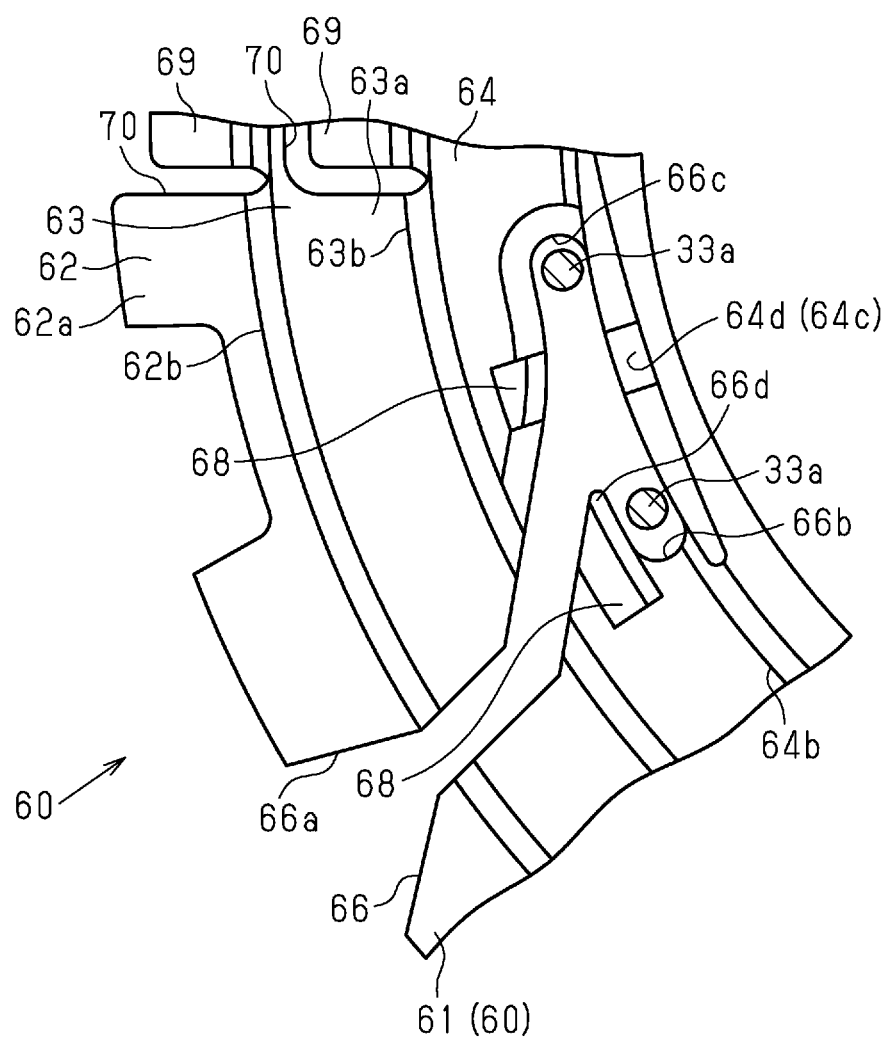
FIG. 7 is a plan view showing a portion of the guide member of the embodiment.

As shown in FIG. 7, the first slit 66 is configured to draw in two terminal wires 33a of the coils 33. The second slit 67 is configured to draw in one terminal wire 33a of the coil 33.

Figure 11:
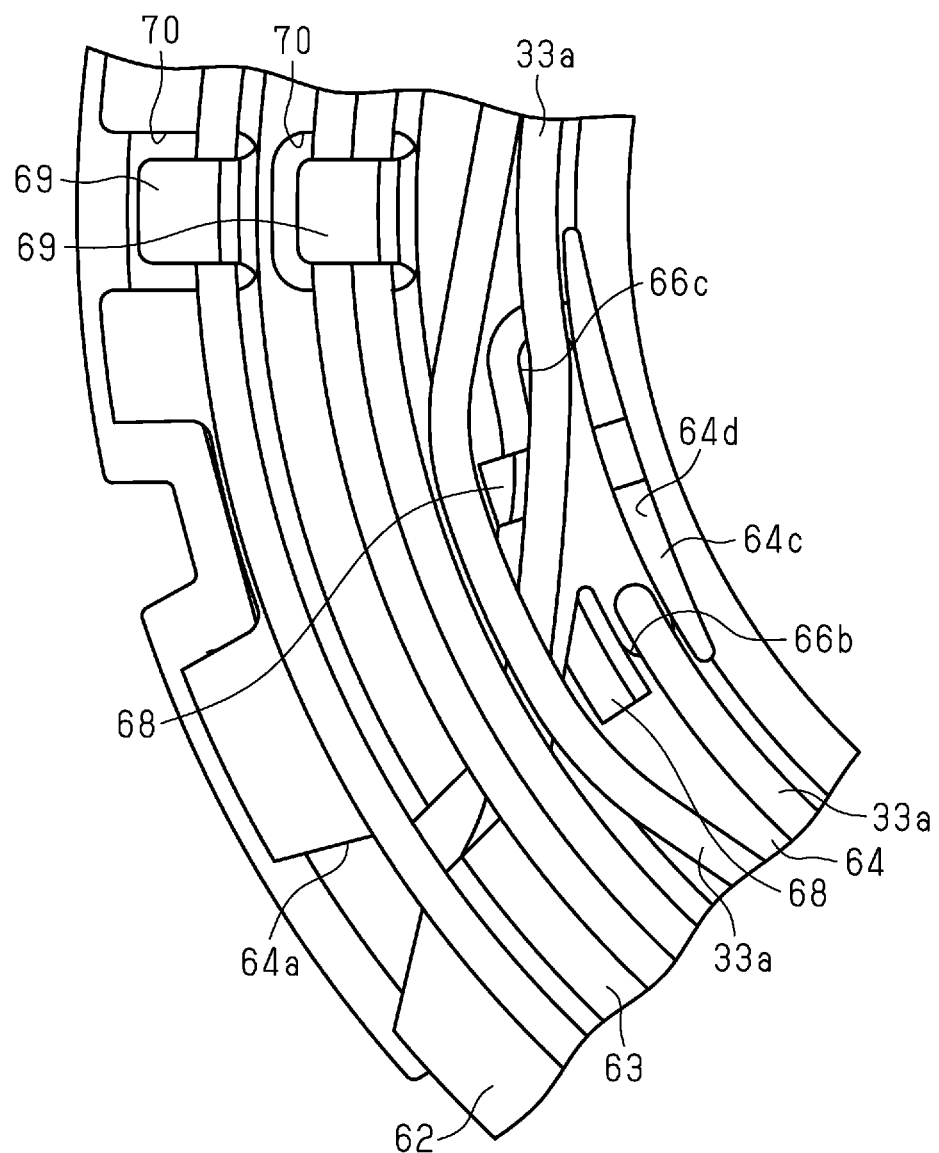
FIG. 11 is a plan view showing a portion of the stator in the embodiment.

As shown in FIG. 11, each of the first slits 66 includes a guide 66a, which is cut away in the radial direction, and two holders 66b and 66c, which are in communication with the guide 66a and hold the terminal wires 33a of the coils 33.

The guide 66a, which corresponds to a radial slit portion, extends in the base 62a of the lower step 62 wider in a radially outward direction. Thus, the terminal wires 33a of the coils 33 are easily guided.

The holder 66b, which corresponds to a circumferential slit portion, is in communication with the guide 66a at a radially inner side of the guide 66a and is cut away toward a first side in the circumferential direction. The holder 66c, which corresponds to a circumferential slit portion, is in communication with the guide 66a at a radially inner side of the guide 66a and is cut away toward a second side in the circumferential direction. That is, the holder 66b and the holder 66c are cut away to opposite sides in the circumferential direction.

The holder 66b includes a circumferential projection 66d, which corresponds to a restriction. The circumferential projection 66d is located at a radially outer side of the holder 66b and extends in the circumferential direction. The circumferential projection 66d limits interference of the terminal wire 33a arranged on the holder 66b with a terminal wire 33a that is later drawn in and mistakenly arranged on the holder 66c.

Each of the second slits 67 includes a guide 67a, which is cut away in the radial direction, and a holder 67b, which is in communication with the guide 67a and holds the terminal wire 33a of the coil 33.

In the same manner as in the first slits 66, the guide 67a, which corresponds to a radial slit portion, extends in the base 62a of the lower step 62 wider in a radially outward direction. Thus, the terminal wires 33a of the stator coils 33 are easily guided.

The holder 67b, which corresponds to a circumferential slit portion, is in communication with the guide 67a at a radially inner side of the guide 67a and is cut away toward the first side or the second side in the circumferential direction.

Separators 68 extend in the axial direction in the vicinity of the first slits 66 of the steps 62, 63, and 64 where the terminal wires 33a of different phases are prone to interfere with each other. In the present example, the intermediate step 63 and the upper step 64 include the separators 68. The separators 68 are located at a radially outer side of the risers 63b and 64b so that the separators 68 are spaced apart from the respective risers 63b and 64b by a gap corresponding to the diameter of the terminal wire 33a. The terminal wire 33a that is located at a radially inner side (inner portion) of the separators 68 is first inserted into the gap and drawn in the circumferential direction. Thereafter, another terminal wire 33a that is located at a radially outer side (outer portion) of the separators 68 is drawn in the circumferential direction.

Portions of the intermediate step 63 and the upper step 64 where the first slits 66 are arranged respectively include corners 63c and 64c at a radially inner side of the first slits 66. The corners 63c and 64c include chamfered portions 63d and 64d. When the terminal wire 33a is drawn along the first slit 66, tension may be applied to the terminal wire 33a so that a portion of the terminal wire 33a extending out of the first slit 66 is located toward a further radially inner side of the radially inner end of the first slit 66. In this case, if the corners are, for example, orthogonal, the terminal wire 33a bends from the corner and tends to separate from the riser, which is the radially opposing surface of the step. In this state, if the terminal wire 33a is drawn in the circumferential direction, the position of the terminal wire 33a that is in contact with the first slit 66 tends to be displaced radially outward. In this regard, as described above, the chamfered within 64d includes the corner 64c to limit the bending at the corner 64c. Thus, the radially outward displacement of the position contacting the slit is limited when the terminal wire 33a is drawn in the circumferential direction.

Figure 12:
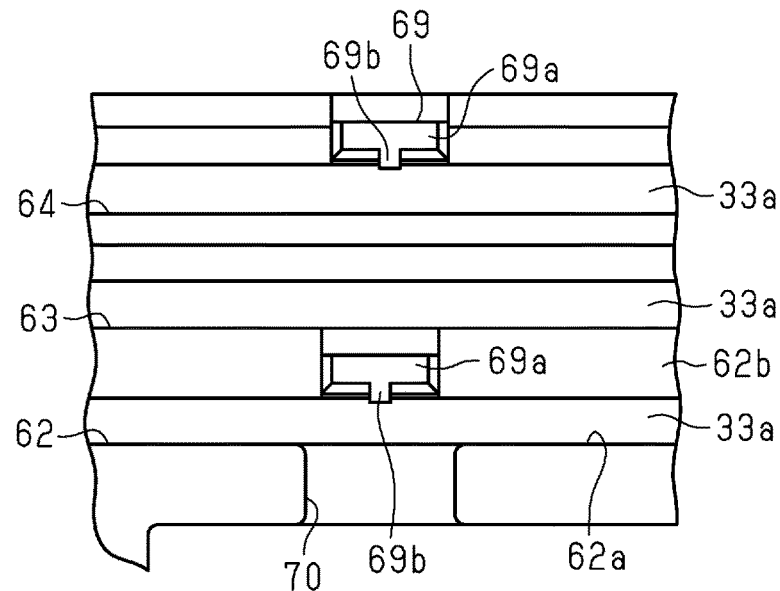
FIG. 12 is a side view showing a portion of the stator in the embodiment.
Figure 13:
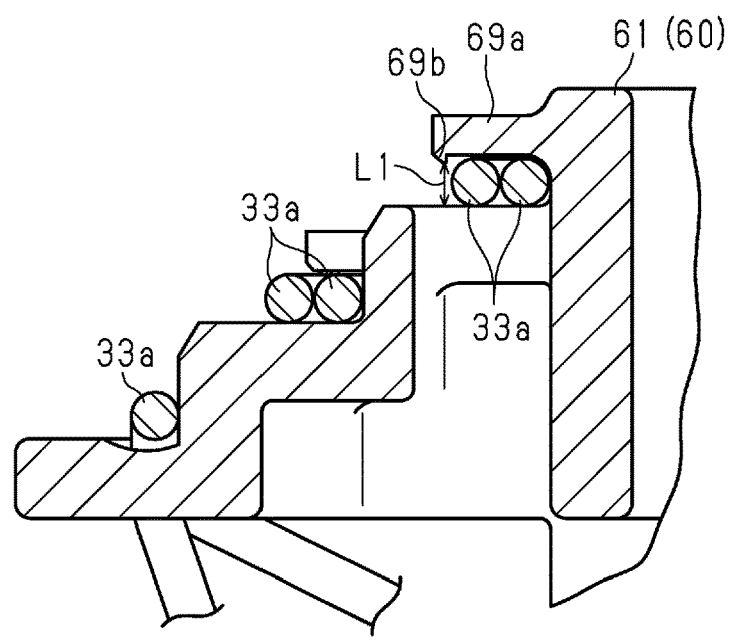
FIG. 13 is a cross-sectional view showing a portion of the guide member in the embodiment.

As shown in FIGS. 6, 12, and 13, the guide body 61 includes terminal wire restrictions 69 extending from each of the risers 62b, 63b, and 64b in the radial direction. In the present example, the risers 62b, 63b, and 64b each include five terminal wire restrictions 69. Each of the terminal wire restrictions 69 includes an extension 69a extending from the corresponding one of the risers 62b, 63b, and 64b in the radial direction and a protrusion 69b extending from the distal side of the extension 69a in the axial direction as a barb. The axial distance L1 from the axial distal end of the protrusion 69b to the bases 62a, 63a, 64a of the steps 62, 63, and 64 is set to be less than the diameter of the terminal wire 33a to limit radial displacement of the terminal wires 33a.

The extensions 69a restrict axial movement of the terminal wires 33a of the stator coils 33 that are drawn around the bases 62a, 63a, and 64a. The protrusions 69b restrict radial movement of the terminal wires 33a of the stator coils 33 that are drawn around the bases 62a, 63a, and 64a. Such restriction on radial and axial movements of the terminal wires 33a limits vibration of the terminal wires 33a. Additionally, the restriction on radial movement of the terminal wires 33a limits interference with a layout operation of another terminal wire when the terminal wire is drawn in the circumferential direction. Thus, the layout is easily performed.

Portions of the bases 62a, 63a, and 64a opposed to the terminal wire restrictions 69 in the axial direction are cut away defining cutaway portions 70. This allows the terminal wires 33a to be temporarily bent toward the cutaway portions 70. For example, in a configuration that does not allow the terminal wires 33a to be temporarily bent toward the cutaway portions 70, if the terminal wire restrictions 69 have the same configuration as the present embodiment, it is difficult for the terminal wires 33a to enter between the bases 62a, 63a, and 64a and the terminal wire restrictions 69. In this case, the position of the terminal wire restrictions 69 may need to be shifted upward. However, in the configuration of the present embodiment, portions of the bases 62a, 63a, and 64a opposed to the terminal wire restrictions 69 in the axial direction are cut away defining the cutaway portions 70. This eliminates the need for upward shifting of the position of the terminal wire restrictions 69, thereby narrowing the clearance between the terminal wire restrictions 69 and the terminal wires 33a as compared to a configuration that does not include the cutaway portions 70. Thus, the terminal wires 33a are stably held between the terminal wire restrictions 69 and portions of the bases 62a, 63a, and 64a extending around the cutaway portions 70.

As shown in FIGS. 3 to 5, the guide member 60 includes attachment pieces 71 extending downward from the lower surface of the base 62a of the lower step 62. The attachment pieces 71 are attached to the insulator 32 of the stator core 31. The attachment pieces 71 and the insulator 32 have snap-fit structures and engage with each other in the axial direction. This limits separation of the guide member 60 from the stator core 31 (insulator 32).

As shown in FIGS. 3 to 5, the guide member 60 includes legs 72 extending downward from the lower surface of the base 62a of the lower step 62. When the guide member 60 is coupled to the stator core 31 (insulator 32), the legs 72 are in contact with the stator core 31 in the axial direction. When the legs 72 are in contact with the stator core 31 and the attachment pieces 71 are engaged with the insulator 32 in the axial direction by the snap-fit structure, the guide member 60 is fixed in a fixed range in the axial direction. This allows axial movement of the guide member 60 relative to the stator core 31 (insulator 32) in the predetermined range, that is, allows a backlash.

Figure 8:
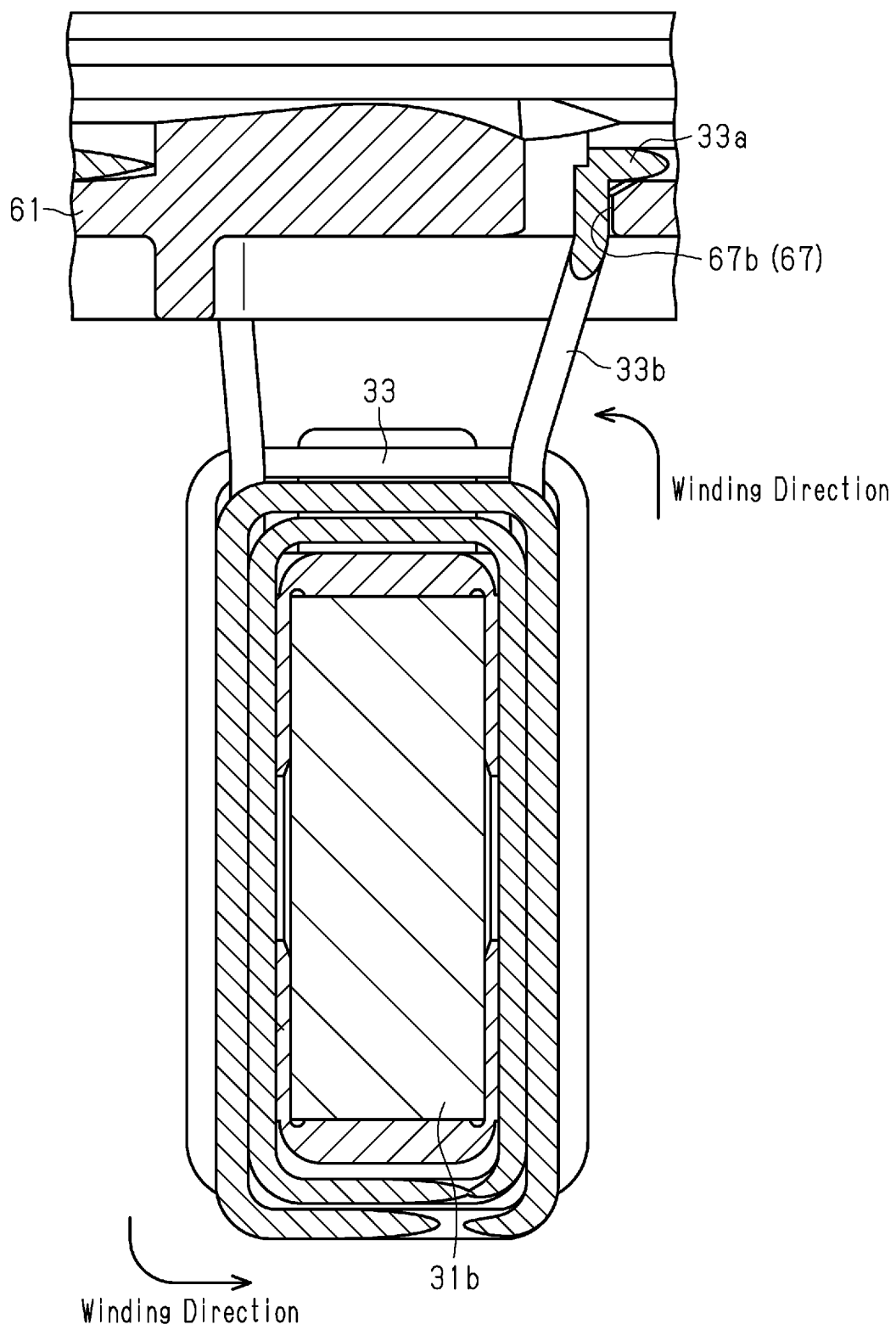
FIG. 8 is a cross-sectional view of the stator of the first embodiment.
Figure 9:
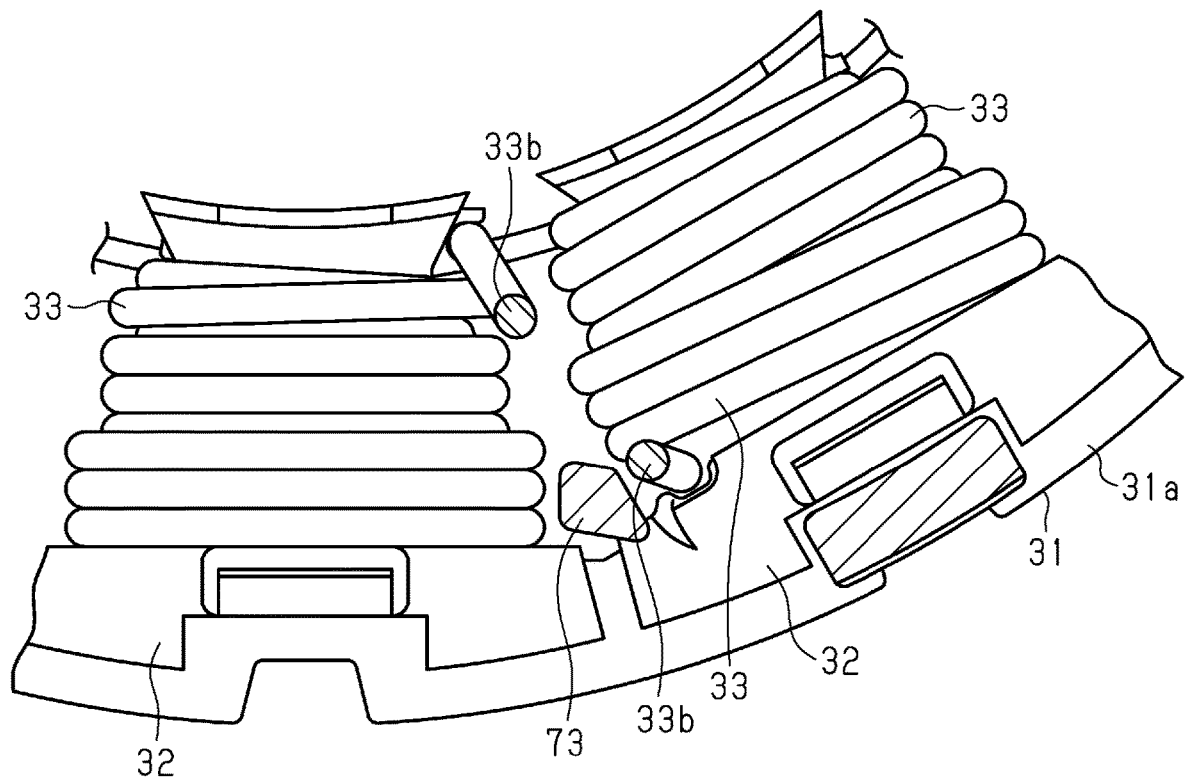
FIG. 9 is a plan view showing a portion of the stator of the embodiment.

As shown in FIGS. 3 and 9, the guide member 60 includes protrudent restrictions 73 extending toward the stator core 31 in the axial direction. The restrictions 73 extend them the lower surface of the base 62a of the lower step 62 toward the stator core 31. When the guide member 60 is coupled to the stator core 31, the restrictions 73, the insulator 32, and the coil 33 surround an axial extension 33b of the coil 33. This restricts movement of the axial extension 33b. Each of the restrictions 73 has an axial distal end located between circumferentially adjacent ones of the coils. The axial distal end is tapered as shown in FIG. 5 along the inclination (refer to FIG. 8) of the axial extension 33b.

As shown in FIG. 8, when the drawing direction in which the coil 33 (terminal wire 33a) is drawn in the circumferential direction conforms to a direction that loosens the winding of the coil 33 (terminal wire 33a) on the stator core 31, the holder 67b, which is the circumferential end of the slit 67 at a radially inner side, is arranged on the axial extension 33b. This restricts movement of the holder 67b in the direction loosening the winding of the coil even when the terminal wire 33a is drawn in the circumferential direction.

Each of the steps 62, 63, and 64 of the guide body 61 includes a collector 74 that collects the terminal wires 33a that are drawn around the steps 62, 63, and 64.

Figure 10:
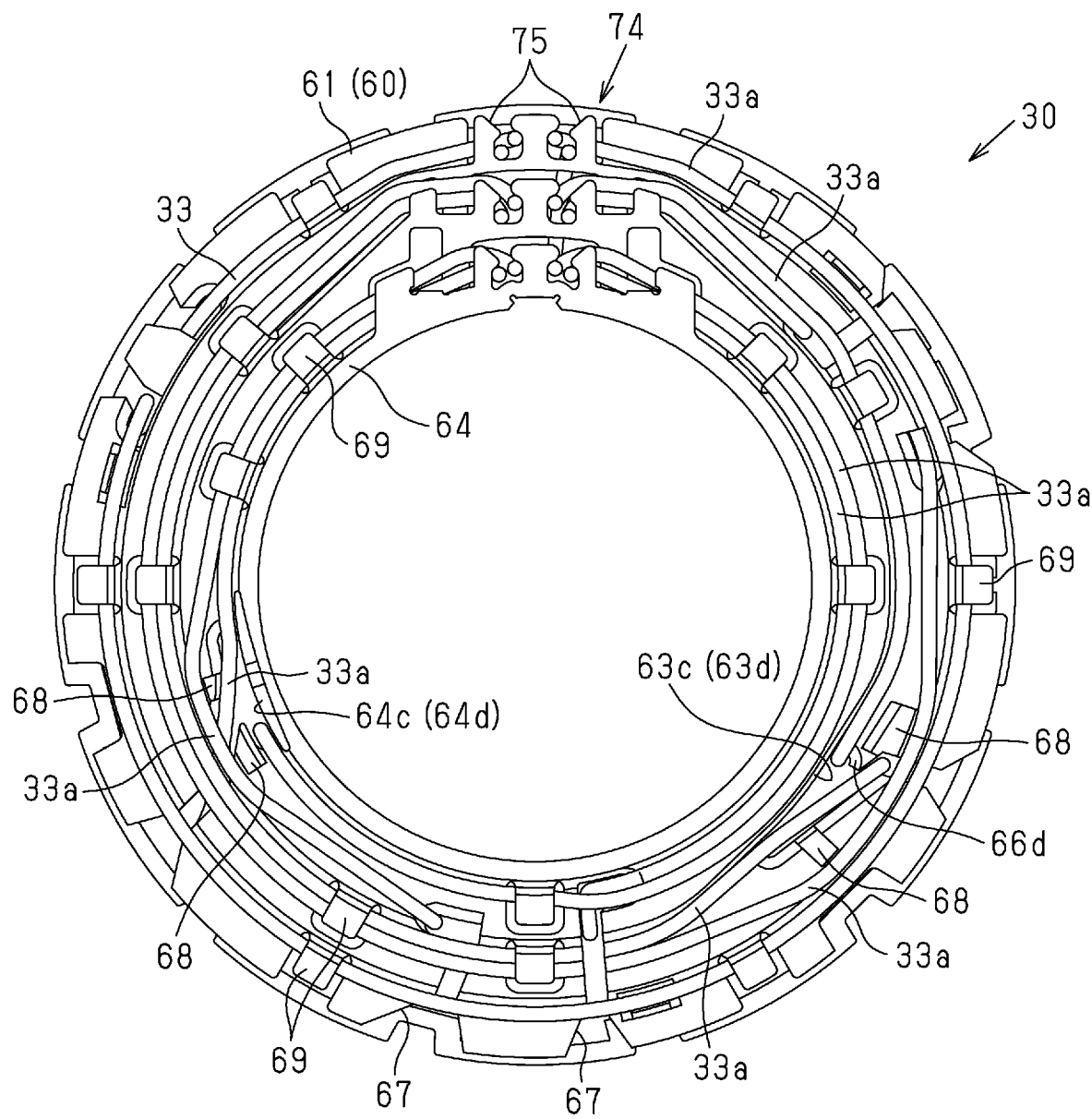
FIG. 10 is a plan view of the stator in the embodiment.
Figure 14:
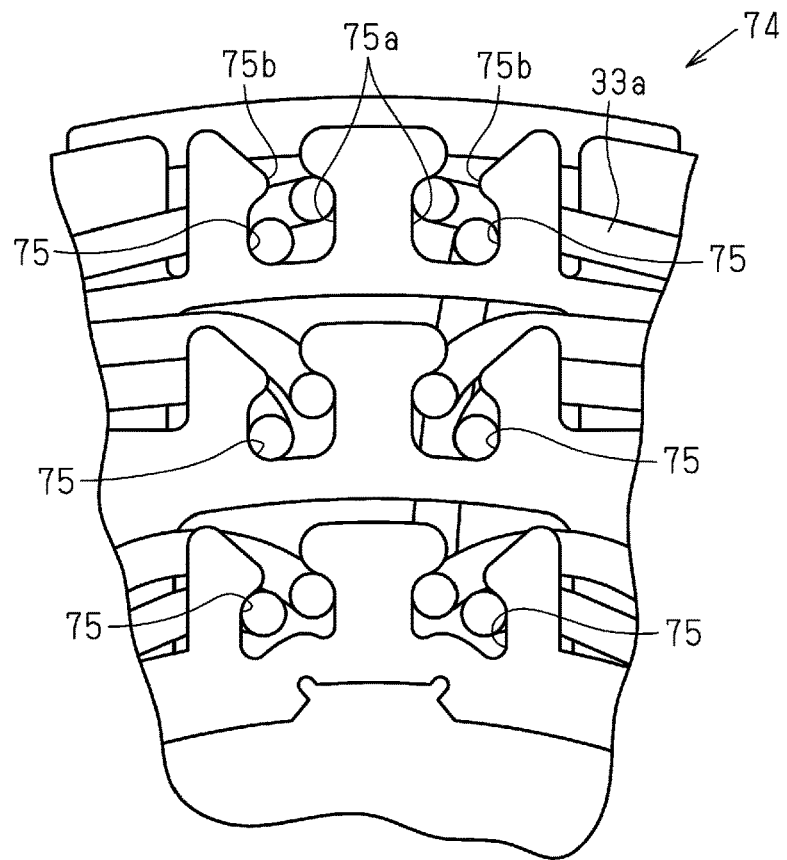
FIG. 14 is a plan view showing a portion of the stator in the embodiment.

As shown in FIGS. 6, 10, and 14, the collector 74 includes loose-fit portions 75. In the present example, two loose-fit portions 75 are provided on each of the steps 62, 63, and 64. Six loose-fit portions 75 are provided in total.

As shown in FIGS. 6, 10, and 14, the loose-fit portions 75 extend radially outward from the risers 62b, 63b, and 64b, each of which has a surface directed in the radially outward direction.

Each of the loose-fit portions 75 includes a retainer 75a and entrances 75b. The retainer 75a has an opening that is greater than the terminal wire 33a and is open in the axial direction. In one example, the retainer 75a has an open width that is more than two times greater than the diameter of the terminal wire 33a. In one example, the retainer 75a has an open area that is more than two times greater than a cross-sectional area of the terminal wire 33a. The entrances 75b are located at a radially outer side of the retainer 75a and have an opening that is smaller than the diameter of the terminal wire 33a and open in the radial direction. The entrances 75b allow entrance of the terminal wires 33a from a radially outer side of the retainer 75a. When the terminal wire 33a passes through the entrance 75b, the terminal wire 33a deforms or the entrance 75b deforms so that the terminal wire 33a enters the retainer 75a. Even when the retainer 75a retains two terminal wires 33a, the terminal wires 33a are loosely fitted to the retainer 75a. This limits excessive tension and damage to the terminal wires 33a.

Figure 15:
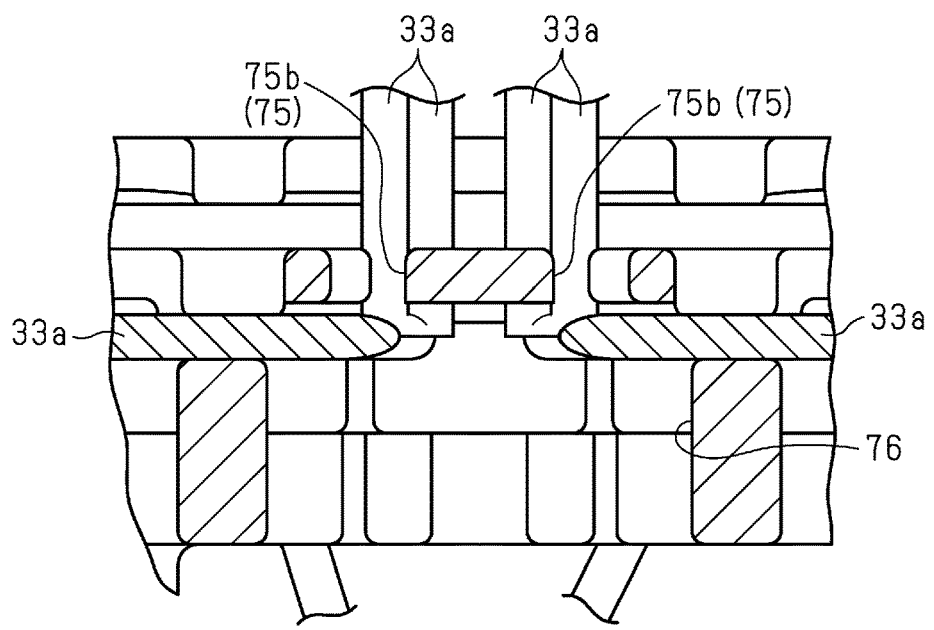
FIG. 15 is a cross-sectional view showing a portion of the stator in the embodiment.

As shown in FIG. 15, the loose-fit portion 75 has a bottom portion including a cutaway portion 76 at a side opposite to the side (upper side) to which the terminal wire 33a extend out of the loose-fit portion 75 in the axial direction. Thus, when the terminal wire 33a upwardly extends out in the axial direction, the terminal wire 33a is allowed to bend toward the cutaway portion 76. Thus, the terminal wire 33a is upwardly drawn from the loose-fit portion 75 in the axial direction.

Figure 17:
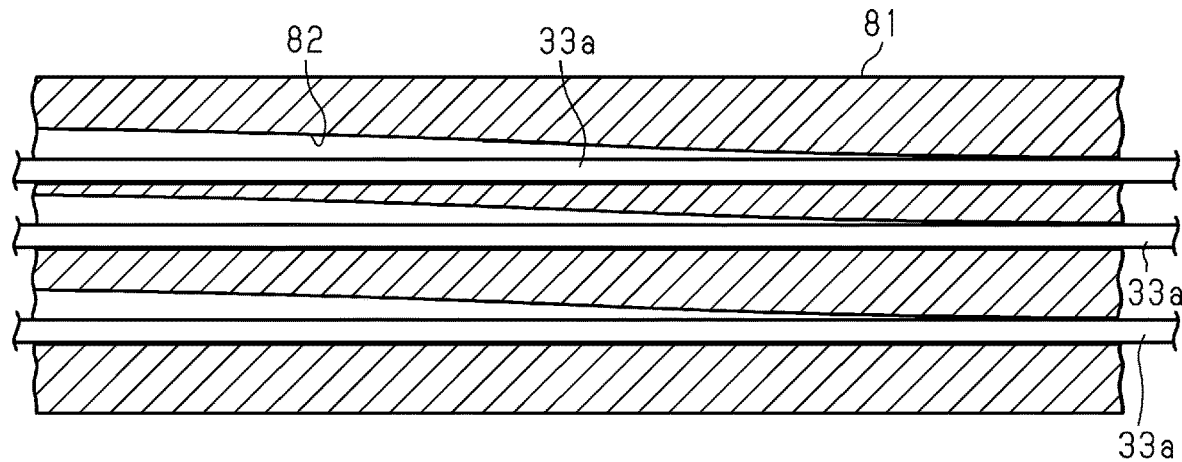
FIG. 17 is a cross-sectional view showing the outlet guide of the guide member in the embodiment.

As shown in FIGS. 16A to 17, the outlet guide 81 is rod-shaped and elongated in the axial direction. The outlet guide 81 includes six through holes 82 corresponding to the six loose-fit portions 75 when coupled to the guide body 61.

When the outlet guide 81 is coupled to the guide body 61, the through holes 82 are opposed to the respective loose-fit portions 75 in the axial direction. The through holes 82 extend in the longitudinal direction of the outlet guide 81 (i.e., axial direction).

The outlet guide 81 is formed from, for example, an insulation material such as resin. Thus, the terminal wire 33a inserted through one of the through holes 82 in the outlet guide 81 is insulated from another terminal wire 33a inserted through another one of the through holes 82. Also, the terminal wires 33a inserted through the through holes 82 are insulated from the casing 11a of the hydraulic unit 11.

As shown in FIGS. 16A to 17, each of the through holes 82 includes an inlet 82a located toward the stator core 31 and an outlet 82b located at a side opposite to the stator core 31. The inlet 82a has a greater open area than the outlet 82b. The through hole 82 has an open area that gradually decreases from the side of the inlet 82a to the side of the outlet 82b. The wall surface of the through hole 82 is curved.

As shown in FIG. 16A, the through holes 82 are tetragonal at positions close to the inlets 82a. As shown in FIG. 16D, the through holes 82 are elliptical at positions close to the outlets 82b. As shown in FIG. 16B, the through holes 82 generally have the form of a triangle having a curve of constant width at intermediate positions between the inlets 82a and the outlets 82b. Such a construction allows the through holes 82 to guide the terminal wires 33a so that the terminal wires 33a inserted in the through holes 82 are arranged in a predetermined direction. Additionally, when the through holes 82 have the form of a triangle having a curve of constant width (i.e., Reuleaux triangle) in an intermediate position, the width may correspond to, for example, the diameter of two terminal wires 33a. This allows for movement of the two terminal wires 33a in the position and adjustment of positions of the terminal wires 33a.

The open area of the through holes 82 at positions close to the inlets 82a is sufficiently greater than each terminal wire 33a. Thus, the terminal wire 33a is in a non-fixed state. As the non-fixed portion of the terminal wire 33a becomes longer, the resonance frequency lowers. When the through holes 82 have a constant cross-sectional area in a predetermined range from the outlets 82b, the resonance frequency may increase.

A method for manufacturing the stator of the present embodiment will now be described.

Figure 18:
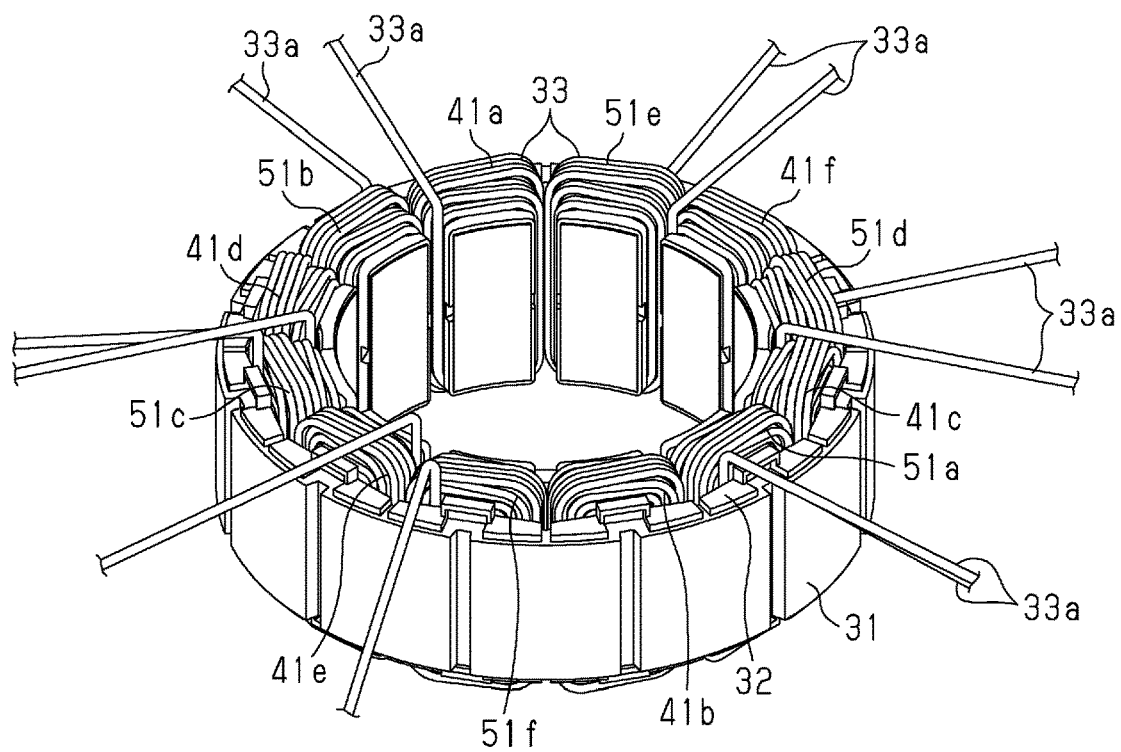
FIG. 18 is a diagram showing a method for manufacturing the stator in the embodiment.

As shown in FIG. 18, the coils 33 are wound on the teeth 31b of the stator core 31.

Then, as shown in FIG. 18, the terminal wires 33a of the coils 33, which are wound on the teeth 31b of the stator core 31, extend out of the stator core 31 in the axial direction and bend in the radial direction (bending step).

Figure 19:
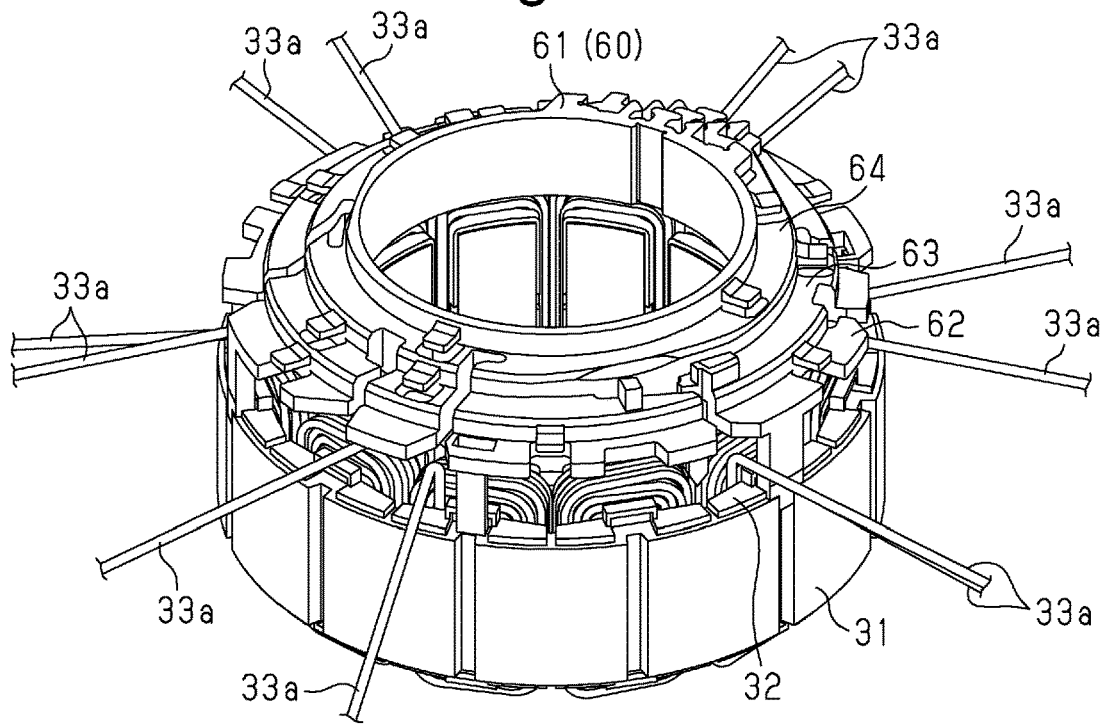
FIG. 19 is a diagram showing a method for manufacturing the stator in the embodiment.

As shown in FIG. 19, the guide body 61 of the guide member 60 is coupled to an axial side (upper side) of the stator core 31 (coupling step). At this time, since each terminal wire 33a is bent in the radial direction in the bending step, interference of the guide member 60 with the terminal wire 33a is limited.

Figure 20:
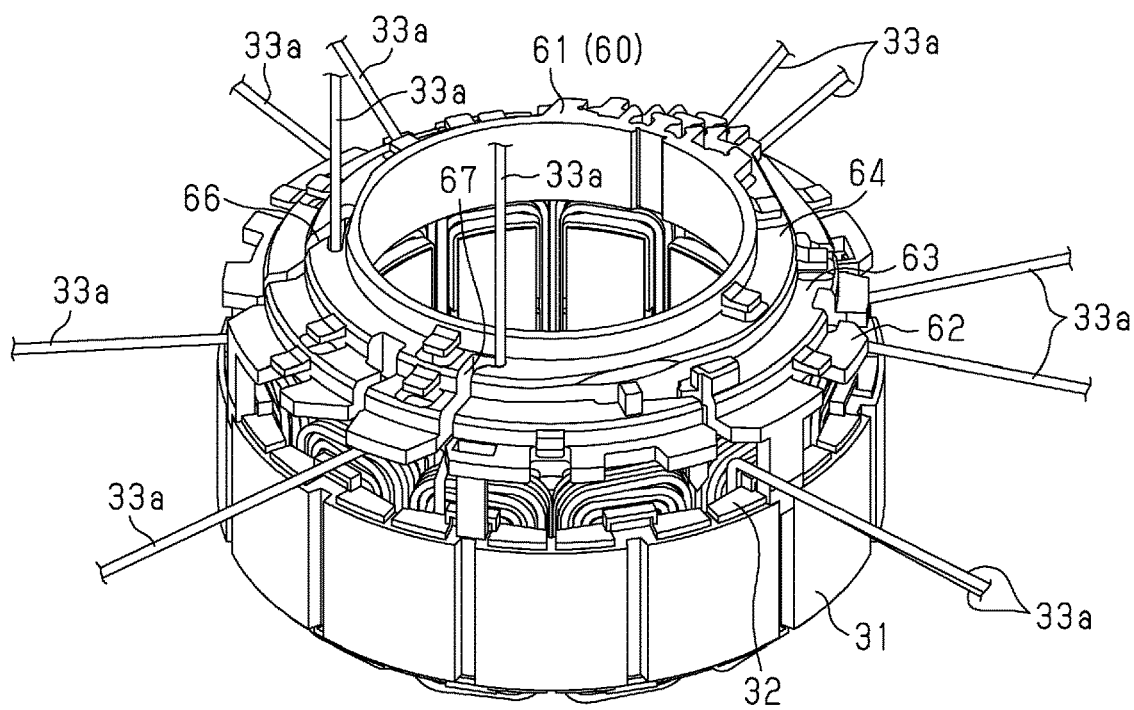
FIG. 20 is a diagram showing a method for manufacturing the stator in the embodiment.

As shown in FIG. 20, the terminal wires 33a are drawn into the respective slits 66 and 67. At this time, the terminal wires 33a of the phase windings connected to the same terminal are drawn into the respective slits 66 and 67.

Figure 21:
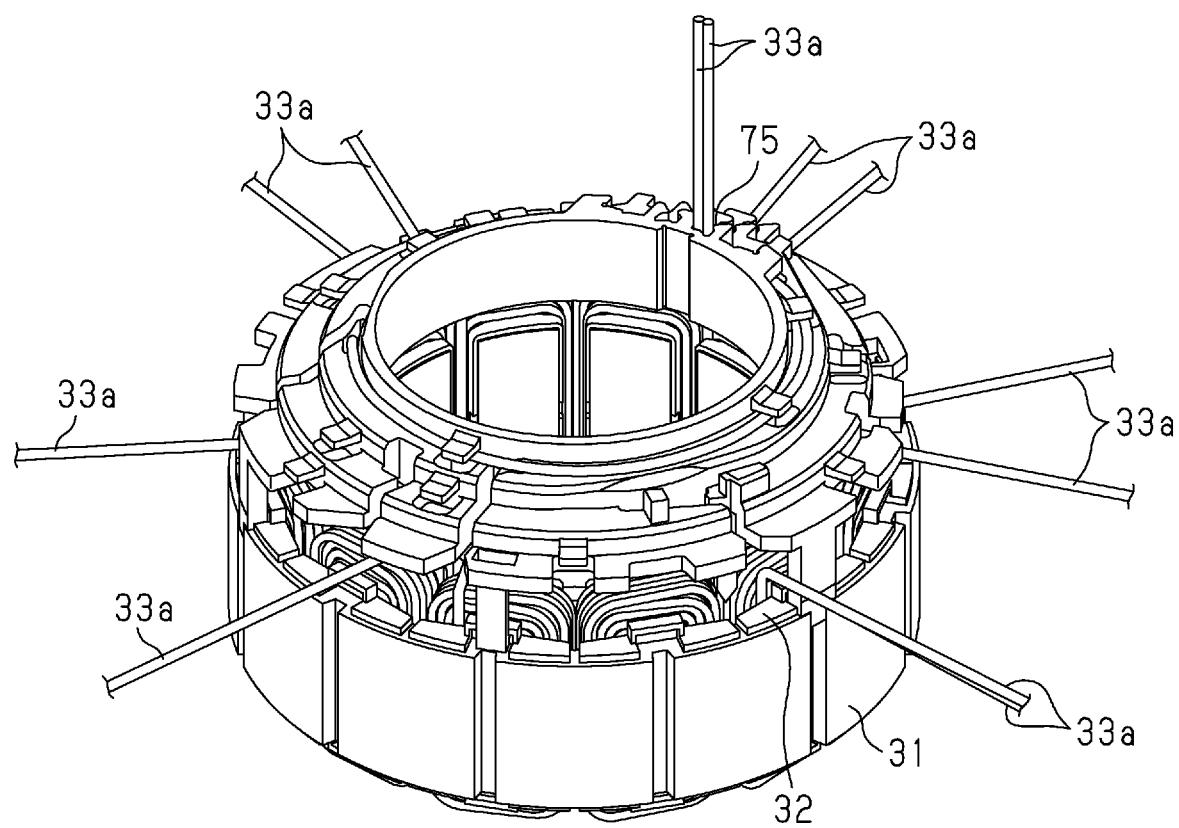
FIG. 21 is a diagram showing a method for manufacturing the suitor in the embodiment.

As shown in FIG. 21, the terminal wires 33a of the multiphase coils 33 that are drawn toward the same side in the circumferential direction are laid out on the upper step 64 of the guide member 60 (layout step). Each of the terminal wires 33a is retained by the loose-fit portion 75 and extends out of the loose-fit portion 75 in the axial direction (extending step). The layout step and the extending step are repeated for each terminal wire 33a. In the present example, the layout step is repeatedly performed on the terminal wires 33a in the order from the one that is to be laid out on the radially inner side (upper step 64).

Thereafter, when the terminal wires 33a retained by the loose-fit portions 75 are inserted through the through holes 82 in the outlet guide 81, the outlet guide 81 is inserted into the through hole 11b in the casing 11a of the hydraulic unit 11. The terminal wires 33a are electrically connected to the respective inverter circuits formed can a circuit board in the EDU 12.

The present embodiment has the advantages described below.

(1) The terminal wires 33a are guided by the guide member 60 located at the axial end of the stator core 31. This limits enlargement of the guide member 60 in the radial direction. Among the coils 33, the coils 33 having the terminal wires 33a drawn in the same direction are laid out on the same one of the steps 62, 63, and 64. This simplifies the guide member 60 as compared to when the steps 62, 63, and 64 are provided in correspondence with each terminal wire 33a.

(2) The slits 66 and 67 of the guide member 60 guide the terminal wires 33a of the coils 33. Also, the slits 66 and 67 retain the terminal wires 33a.

(3) Each slit 66 includes the guide 66a, which is cut away in the radial direction, and the holders 66b and 66c, which are cut away from a radially inner side of the guide 66a to opposite sides in the circumferential direction. The holders 66b and 66c, which are cut away to opposite sides in the circumferential direction, hold and guide the terminal wires 33a of the two coils 33.

(4) The guide member 60 includes the separators 68. This separates the terminal wires 33a of the coils 33 that are arranged on one of the steps 62, 63, and 64 from each other and limits interference of the terminal wires 33a with each other.

(5) The slits 67 are separated from each other in the radial direction. Thus, the terminal wires 33a of the coils 33 guided by the slits 67 are separated from each other in the radial direction.

(6) The steps 62, 63, and 64 include the terminal wire restrictions 69, each of which includes the protrusion 69b extending in the axial direction. The axial distance from the axial distal end of the protrusion 69b to the bases 62a, 63a, and 64a of the steps 62, 63, and 64 is less than the diameter of the terminal wire 33a of the coil 33. This limits radial displacement of the terminal wire 33a of the coil 33.

(7) The bases 62a, 63a, and 64a of the steps 62, 63, and 64 opposed to the terminal wire restrictions 69 in the axial direction include the cutaway portions 70. This facilitates the layout of the terminal wires 33a on the terminal wire restrictions 9.

(8) The bending step is performed before the coupling step. Thus, when the guide member 60 is coupled to the stator core 31, interference of the guide member 60 with the terminal wires is limited, thereby facilitating the coupling step.

(9) In the layout step, before the terminal wires 33a of the coils 33 are drawn in the circumferential direction, the terminal wires 33a of the coils 33 are maintained in a state bent radially outward. Thus, when laying out the terminal wires 33a of the coils 33, interference of a terminal wire 33a of a coil 33 that is being drawn in the circumferential direction with a terminal wire 33a of a coil 33 that has not been drawn in the circumferential direction is limited. This facilitates the layout step.

(10) In a typical stator, for example, when coils are arranged on the stator core and terminal wires of the coils are drawn in the circumferential direction, the terminal wires of adjacent ones of the coils in the circumferential direction may come into contact with each other. The guide member 60 of the present disclosure includes the restrictions 73 located at positions differing from (adjacent to) the axial extensions 33b of the coils 33 in a direction intersecting with the axial direction. The restrictions 73 are configured to contact the axial extensions 33b to restrict movement of the axial extensions 33b in a direction intersecting with the axial direction. This limits interference of the coils 33 adjacent to each other in the circumferential direction with each other.

(11) The restrictions 73 are protrudent and extend from the guide member 60 toward the stator core 31 in the axial direction. The restrictions 73 are located close to the axial extensions 33*b* of the coils 33 and restrict movement of the axial extensions 33*b* in a further assured manner.

(12) Each protrudent restriction 73 is located at a position holding the axial extension 33*b* with the stator core 31 and the insulator 32. This restricts movement of the axial extension 33*b* and limits interference of the coils 33 located adjacent to each other in the circumferential direction with each other.

(13) The axial distal end of each restriction 73 is tapered and is located between the coils 33 adjacent to each other in the circumferential direction. Thus, the axial distal end of the restriction 73 is located close to the coil end (axial extension 33*b*) of the coil 33. This limits movement of the axial extension 33*b* and limits interference of the coils 33 located adjacent to each other in the circumferential direction with each other.

(14) The guide member 60 includes the slits 66 and 67 to hold the terminal wires 33*a* of the coils 33. The slits 66 and 67 also hold the terminal wires 33*a* of the coils 33.

(15) The steps 63 and 64 include the chamfered portions 63*d* and 64*d* on the corners 63*c* and 64*c*, which are located at a radially inner side of the slits 66. When the terminal wire 33*a* is drawn in the circumferential direction along the slit 66, tension may be applied to the terminal wire 33*a* so that a portion of the terminal wire 33*a* extending out of the first slit 66 is located toward a further radially inner side of the radially inner end of the first slit 66. In this case, if the corners are, for example, orthogonal, the terminal wire 33*a* bends from the corner and tends to separate from a radially opposing surface (riser) of the step. In this state, if the terminal wire is drawn in the circumferential direction, the position of the terminal wire that contacts the slit tends to be displaced radially outward. In this regard, as described above, the corners 63*c* and 64*c* include the chamfered portions 63*d* and 64*d* to limit the bending from the corners 63*c* and 64*c*. Thus, the radially outward displacement of the position contacting the slit 66 is limited when the terminal wire 33*a* is drawn in the circumferential direction.

(16) When the drawing direction in which the terminal wire 33*a* of the coil 33 is drawn in the circumferential direction conforms to a direction loosening the winding of the coil 33 from the stator core 31, the holder 67*b*, which is the circumferential end of the slit 67 at a radially inner side, is arranged on the axial extension 33*b*. This restricts movement of the holder 67*b*, or the circumferential end, in a direction loosening the winding of the coil 33 even when the coil 33 is drawn in the circumferential direction.

(18) Each restriction 73 includes the circumferential projection 66*d*, which corresponds to an interference reducer located at a radially outer side of one of the holders 66*b* and 66*c* located at opposite sides in the circumferential direction. The circumferential projection 66*d* projects toward a side opposite to a direction in which the holder 66*b* is cut away. Thus, when a terminal wire 33*a* is guided in the holder 66*b* and another terminal wire 33*a* is drawn into the other holder 66*c*, the circumferential projection 66*d* limits interference of the terminal wires 33*a* with each other.

(19) In a typical stator, when terminal wires of coils wound on the guide member are connected to a control circuit, an excessive tension may be applied to the terminal wires. In the present disclosure, the collector 74, which collects the terminal wires 33*a*, includes the loose-fit portions 75 holding the terminal wires 33*a* of the coils 33 in a loosely-fitted state. This limits excessive tension applied to the terminal wires 33*a*.

(20) Each loose-fit portion 75 includes the entrances 75*b* allowing entrance of the coil 33 from a radially outer side of the retainer 75*a* and having an opening smaller than the diameter of the coil 33. This limits separation of the terminal wires 33*a* of the coils 33 from the retainer 75*a*.

(21) The terminal wires 33*a* of the coils 33 having the same phase are arranged on each retainer 75*a* of the loose-fit portions 75. This allows for reduction in the space and miniaturization of the guide member 60.

(22) The steps 62, 63, and 64 include cutaway portions at a side opposite to a direction in which the terminal wire 33*a* extends out of the loose-fit portions 75. As a result, when the terminal wire 33*a* is drawn in the circumferential direction and then extends out in the axial direction, the terminal wire 33*a* is allowed to bend in the cutaway portions. This allows the terminal wire 33*a* to upwardly extend from the loose-fit portions 75 in the axial direction.

(23) The steps 62, 63, and 64 include the terminal wire restrictions 69 including the protrusions 69*b* extending in the axial direction. The axial distance from the axial distal end of each protrusion 69*b* to the bases 62*a*, 63*a*, and 64*a* of the steps 62, 63, and 64 is less than the diameter of the terminal wire 33*a* of the coil 33. This restricts radial displacement of the terminal wire 33*a* of the coil 33.

(24) The bases of the steps opposed to the terminal wire restrictions 69 in the axial direction include the cutaway portions. This facilitates the layout of the terminal wires 33*a* on the terminal wire restrictions 69.

The above-described embodiment may be modified as follows. The embodiment and modified examples described below may be combined with each other as long as there is no technical contradiction.

In the embodiment, the guide body 61 of the guide member 60 includes the lower step 62, the intermediate step 63, and the upper step 64 and has a three-step structure. Instead, for example, the guide body may have the shape of two steps. Such a structure allows for reduction in the size of the guide body.

In the embodiment, the first slit 66 includes the holders 66*b* and 66*c* that are cut away from a radially inner side of the guide 66*a* to opposite sides in the circumferential direction. Instead, one of the holders 66*b* and 66*c* may be omitted. More specifically, for example, the second slit 67 may be used instead of the first slit 66. When the second slit 67 is used instead of the first slit 66, two second slits 67 may be provided for one first slit 66 to have substantially the same function.

In the embodiment, the slits 67 arranged in the same one of the steps 62, 63, and 64 are separated from each other in the radial direction. Instead, the slits 67 arranged in the same one of the steps 62, 63, and 64 may be aligned with each other in the radial direction.

In the embodiment, the separators 68 are arranged at positions adjacent to the slits 65. However, such a configuration may be omitted.

In the embodiment, the slits 65 are configured to guide the coils 33 to the steps 62, 63, and 64 from a radially outer side toward a radially inner side. However, such a configuration can be omitted.

On the embodiment, the axial distance L1 between the protrusions 69*b* of the terminal wire restrictions 69 and the bases 62*a*, 63*a*, and 64*a* is set to be smaller than the diameter of the coil 33 (i.e., terminal wire 33*a*). Instead, the axial distance L1 may be set to be, for example, substantially equal to the diameter of the coil 33.

In the embodiment, the cutaway portions 70 are arranged at portions opposed to the terminal wire restrictions 69 in the axial direction. However, the cutaway portions 70 may be omitted.

In the embodiment, the terminal wire restrictions 69 are provided. However, the terminal wire restrictions 69 may be omitted.

In the embodiment, different stator coils 33 are wound on each one of the teeth 31b, and the stator coils 33 are wound on the stator 30, for example, in the order of the U+ phase winding 41a, the W− phase winding 41f, the Z+ phase winding 51e, the Y− phase winding 51d, the V+ phase winding 41c, the U− phase winding 41b, the X+ phase winding 51a, the Z− phase winding 51f, the W+ phase winding 41e, the V− phase winding 41d, the Y+ phase winding 51c, and the X− phase winding 51b. Instead, the stator coils 33 may be wound on the stator 30, for example, in the order of the U+ phase winding 41a, the Z+ phase winding 51e, the W− phase winding 41f, the Y− phase winding 51d, the V+ phase winding 41c, the X+ phase winding 51a, the U− phase winding 41b, the Z− phase winding 51f, the W+ phase winding 41e, the Y+ phase winding 51c, the V− phase winding 41d, and the X− phase, winding 51b.

In the embodiment, the two inverter circuits, which correspond to two power supplies, are provided so that the configuration has redundancy. Instead, each of the phase windings 40 and 50 may be supplied with three-phase alternating current from a single inverter circuit to drive the motor.

In the embodiment, two terminal wires 33a are arranged of each of the loose-fit portions 75. Instead, for example, when the motor is driven by a single inverter circuit as described above, four terminal wires 33a may be arranged on one loose-fit portion 75.

In the embodiment, the holder 66b includes the circumferential projection 66d, which corresponds to the interference reducer (restriction). However, such a configuration may be omitted.

In the embodiment, the holder 67b is arranged on the axial extension 33b. Instead, the holder 67b and the axial extension 33b may be arranged at different positions in the circumferential direction.

In the embodiment, the corners 63c and 64c include the chamfered portions 63d and 64d. However, the chamfered portions 63d and 64d may be omitted.

In the embodiment, the axial distal end of the restriction 73 is tapered. Instead, the axial distal end of the restriction 73 may have a fixed width.

In the embodiment, the axial extension 33b is surrounded by (held among) the restriction 73, the coil 33, and the insulator 32. Instead, for example, the axial extension 33b may be held between the restriction 73 and the coil 33. The axial extension 33b may be held between the restrictions 73 and the insulator 32.

In the embodiment, the layout step is repeatedly performed on the terminal wires 33a in the order from the one that is to be laid out on the radially inner side (upper step 64). Instead, the layout step may be repeatedly performed on the terminal wires 33a in the order from the one that is to be laid out on the radially outer side (lower step 62) or radially middle side (intermediate step 63).

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A stator comprising:
   a stator core;
   a plurality of multiphase coils wound on the stator core and including two or more terminal wires; and
   a guide member arranged on an end of the stator core located at one side in an axial direction to guide the terminal wires of the multiphase coils wound on the stator core, wherein:
   the guide member includes steps having a diameter that gradually decreases toward a side opposite to the stator core in the axial direction,
   one of the multiphase coils having the terminal wires that are drawn in a circumferential direction toward the same side are laid out on one of the steps, and
   the guide member includes a slit that guides the terminal wires to the one of the steps from a radially outer side toward a radially inner side.

2. The stator according to claim 1, wherein the slit includes a radial slit portion that is cut away in a radial direction and circumferential slit portions that are cut away from a radially inner side of the radial slit portion to opposite sides in the circumferential direction.

3. The stator according to claim 2, wherein
   the guide member includes a separator located adjacent to the slit, and
   the separator is configured to separate the coils arranged on the one of the steps from each other.

4. The stator according to claim 1, wherein
   the slit is one of slits,
   the one of the steps includes the slits, and
   the slits have ends separated from each other in a radial direction.

5. The stator according to claim 1, wherein
   at least one of the multiphase coils includes an axial extension extending from the stator core in the axial direction,
   the guide member includes a restriction located at a position separated from the axial extension in a direction intersecting with the axial direction, and
   the restriction is configured to contact the axial extension to restrict movement of the axial extension in the direction intersecting with the axial direction.

6. The stator according to claim 5, wherein the restriction includes a protrusion extending from the guide member toward the stator core in the axial direction.

7. The stator according to claim 6, wherein
   the protrusion is arranged at a position holding the axial extension with at least one of an insulator and one of the multiphase coils including the axial extension, and
   the insulator is coupled to the stator core.

8. The stator according to claim 6, wherein the protrusion includes a tapered axial distal end located between two of the multiphase coils that are adjacent to each other in the circumferential direction.

9. The stator according to claim 5, wherein the guide member includes a slit that guides at least one of the multiphase coils toward the steps from a radially outer side toward a radially inner side.

10. The stator according to claim 9, wherein at least one of the steps includes a corner located at a radially inner side of the slit, the corner including a chamfered portion.

11. The stator according to claim 9, wherein
the slit includes a circumferential end located at a radially inner side, and
when a drawing direction in which the coils are drawn in the circumferential direction conforms to a direction that loosens a winding of the coils on the stator core, the circumferential end of the slit is located on the axial extension of the coils.

12. The stator according to claim 9, wherein the slit includes a radial slit portion that is cut away in a radial direction and circumferential slit portions that are cut away from a radially inner side of the radial slit portion to opposite sides in the circumferential direction.

13. The stator according to claim 12, wherein
the restriction includes a circumferential projection located at a radially outer side of one of the circumferential slit portions formed at opposite sides in the circumferential direction, and
the circumferential projection projects toward a side opposite to a direction in which one of the circumferential slit portions is cut away.

14. The stator according to claim 1, wherein
the guide member further includes a collector that collects the terminal wires of the multiphase coils, and
the collector includes a loose-fit portion that holds the terminal wires of the multiphase coils in the axial direction so that the terminal wires are in a loosely-fitted state.

15. The stator according to claim 14, wherein
the loose-fit portion extends radially outward from at least one of the steps,
the loose-fit portion includes a retainer and an entrance,
the retainer is open in the axial direction and has an open area that is greater than a diameter of the terminal wire, and
the entrance has an open area that is less than a diameter of the coil and is configured to allow entrance of the coil from a radially outer side of the retainer.

16. The stator according to claim 14, wherein
the loose-fit portion is one of loose-fit portions, and
the collector includes the loose-fit portions, and
two or more of the terminal wires of the multiphase coils in the same phase are arranged on each retainer of the loose-fit portions.

17. The stator according to claim 14, wherein
when the terminal wires extend out of the loose-fit portion in the axial direction, the loose-fit portion holds the terminal wires, and
at least one of the steps includes a cutaway portion at a side opposite to a direction in which the terminal wires extend out.

18. The stator according to claim 14, wherein
at least one of the steps includes a terminal wire restriction including a barb extending in the axial direction,
the barb includes an axial distal end,
at least one of the steps includes a base, and
the axial distal end of the barb is separated from the base of at least one of the steps in the axial direction by a distance that is less than a diameter of the coil.

19. The stator according to claim 18, wherein the base of at least one of the steps opposed to the terminal wire restriction in the axial direction includes a cutaway portion.

20. A method for manufacturing the stator according to claim 1, the method comprising:
extending the terminal wires of the coils out of the stator core from one side in the axial direction of the stator core and bending the terminal wires of the coils radially outward;
coupling the guide member to one side in the axial direction of the stator core subsequent to the bending of the terminal wires of the coils; and
laying out ones of the multiphase coils having the terminal wires that are drawn in the circumferential direction toward the same side on one of the steps.

21. The method according to claim 20, wherein when laying out the coils on the one of the steps, prior to being drawn in the circumferential direction, the coils are maintained in a state bent radially outward.

22. A stator comprising:
a stator core;
a plurality multiphase coils wound on the stator core and including two or more terminal wires; and
a guide member arranged on an end of the stator core located at one side in an axial direction to guide the terminal wires of the multiphase coils wound on the stator core, wherein
the guide member includes steps having a diameter that gradually decreases toward a side opposite to the stator core in the axial direction,
one of the multiphase coils having the terminal wires that are drawn in a circumferential direction toward the same side are laid out on one of the steps,
the one of the steps includes a terminal wire restriction including a barb extending in the axial direction,
the barb includes an axial distal end,
the step includes a base, and
the axial distal end of the barb is separated from the base of the step in the axial direction by a distance that is less than a diameter of the coil.

23. The stator according to claim 22, wherein the base of the step opposed to the terminal wire restriction in the axial direction includes a cutaway portion.

* * * * *